US012123571B2

(12) United States Patent
Chiang et al.

(10) Patent No.: US 12,123,571 B2
(45) Date of Patent: Oct. 22, 2024

(54) STREETLIGHT AND NETWORK EQUIPMENT MANAGEMENT SYSTEM

(71) Applicant: Agileiots Investment Co., Ltd., Taoyuan (TW)

(72) Inventors: Jo-Yi Chiang, Kaohsiung (TW); Chia-Chen Lin, New Taipei (TW); Tsung-Hsun Kuo, New Taipei (TW); Sheng Jung Wang, Taipei (TW)

(73) Assignee: Agileiots Investment Co., Ltd., Taoyuan (TW)

( * ) Notice: Subject to any disclaimer, the term of this patent is extended or adjusted under 35 U.S.C. 154(b) by 0 days.

(21) Appl. No.: 18/394,437

(22) Filed: Dec. 22, 2023

(65) Prior Publication Data

US 2024/0210001 A1 Jun. 27, 2024

(30) Foreign Application Priority Data

Dec. 22, 2022 (TW) ................................. 111149581

(51) Int. Cl.

| | |
|---|---|
| ***F21S 8/08*** | (2006.01) |
| ***F21V 21/36*** | (2006.01) |
| ***F21V 23/00*** | (2015.01) |
| ***F21V 33/00*** | (2006.01) |
| *F21W 131/103* | (2006.01) |

(52) U.S. Cl.

CPC .............. *F21S 8/085* (2013.01); *F21V 21/36* (2013.01); *F21V 23/002* (2013.01); *F21V 33/00* (2013.01); *F21W 2131/103* (2013.01)

(58) Field of Classification Search

CPC ....................................................... F21S 8/085

See application file for complete search history.

(56) References Cited

U.S. PATENT DOCUMENTS

| | | | | |
|---|---|---|---|---|
| 9,253,556 | B1 * | 2/2016 | Pounds | G10K 11/16 |
| 10,947,751 | B2 * | 3/2021 | Lockwood | E04H 12/02 |
| 11,437,701 | B2 * | 9/2022 | Rai | H01Q 1/42 |
| 2003/0233806 | A1 * | 12/2003 | Kuebler | E04H 12/12 362/431 |
| 2013/0027933 | A1 * | 1/2013 | Sullivan | F21V 23/026 361/679.01 |
| 2018/0219278 | A1 * | 8/2018 | Wigdahl | H01Q 1/1242 |
| 2018/0351245 | A1 * | 12/2018 | Constance | H01Q 1/245 |
| 2020/0136236 | A1 * | 4/2020 | Colapietro | H01Q 21/0025 |
| 2020/0190842 | A1 * | 6/2020 | Ducros | H02G 3/083 |
| 2020/0388902 | A1 * | 12/2020 | Colapietro | H01Q 1/44 |
| 2021/0313665 | A1 * | 10/2021 | Hoganson | H01Q 1/02 |

* cited by examiner

*Primary Examiner* — Zheng Song
(74) *Attorney, Agent, or Firm* — Chun-Ming Shih; LANWAY IPR SERVICES

(57) ABSTRACT

A streetlight can allow for the installation of various network equipment through the design of a disassembling rack to meet the construction needs of a smart city. A network equipment management system provides the network leasing and the power supply leasing to enable the management of the network bandwidth, the network traffic, the network communication ports, or the network providing time, wherein the network is connected to network equipment, as well as the management of the power of the power supply, the power supply ports, or the power supply providing time, wherein the network is connected to the network equipment. Therefore, the streetlight and the network equipment management system in this application can be utilized in the construction of a smart city.

16 Claims, 15 Drawing Sheets

STREETLIGHT AND NETWORK EQUIPMENT MANAGEMENT SYSTEM

CROSS-REFERENCE TO RELATED APPLICATIONS

This application claims the priority of Republic of China Patent Application No. 111149581 filed on Dec. 22, 2022, in the State Intellectual Property Office of the R.O.C., the disclosure of which is incorporated herein by reference.

BACKGROUND OF THE INVENTION

Field of the Invention

This application is related to the field of streetlight device technology. More specifically, it is related to a streetlight and its network equipment management system that can be used in smart city construction.

Descriptions of the Related Art

With the continuous development of network technology, the level of application of urban informatization is constantly rising, giving rise to the construction of smart city. The construction of smart city is inevitably dependent on the widespread installation of network equipment. Therefore, in various public areas of smart city, the installation of network equipment is ubiquitous. For instance, network surveillance cameras used for urban security management or traffic monitoring, or network environmental detectors used to monitor the quality of the urban environment.

However, there is currently no regulation in place for the installation of network equipment in city. Some network equipment is directly installed on poles in the city. When this happens, the origin road in city may need to be installed electrical circuits, and it could disrupt the original road construction plan in city and compromise the original appearance of the city. Furthermore, some network equipment is chosen to be installed using streetlights that have extensive coverage and existing electrical circuits in the city. However, because streetlights in the city are primarily designed for street illumination and not for installing other devices, the current structural design of streetlights cannot accommodate the installation of various types of network equipment.

In view of this, how to design a streetlight that can be equipped with various network equipment is the technical challenge addressed by the present invention.

SUMMARY OF THE INVENTION

In view of the drawbacks of the prior art mentioned above, the present application provides a streetlight, which is capable of equipped with a network, a power, and a pole interior network equipment, comprising a network cable connected to the network; a power supply cable connected to the power; a pole interior disassembling rack including a pole interior rack network connector and a pole interior rack power supply connector, wherein the pole interior disassembling rack is capable of installing the pole interior network equipment, wherein the pole interior rack network connector and the pole interior rack power supply connector can be respectively connected to the pole interior network equipment installed by the pole interior disassembling rack; a streetlight pole comprising a pole interior space and a pole interior rack disassembling channel, wherein the pole interior space can define a pole interior rack installing area and a pole interior cable installing area, and the pole interior rack disassembling channel is connected to the pole interior rack installing area, and the pole interior cable installing area avoids the pole interior rack disassembling channel, wherein the network cable and the power supply cable are respectively installed in the pole interior cable installing area, and the pole interior disassembling rack can be installed in the pole interior rack installing area via the pole interior rack disassembling channel or removed from the pole interior rack installing area, when the pole interior disassembling rack is installed in the pole interior rack installing area, the pole interior disassembling rack can allow the pole interior network equipment enter the pole interior space, wherein the network cable can extend from the pole interior cable installing area to the pole interior rack installing area, thereby connecting to the pole interior rack network connector, allowing the pole interior network equipment to be connected to the network; and the power supply cable can extend from the pole interior cable installing area to the pole interior rack installing area, thereby connecting to the pole interior rack power supply connector, allowing the pole interior network equipment to be connected to the power, when the pole interior disassembling rack is removed from the pole interior rack installing area, the network cable is disconnected from the pole interior rack network connector, and the power supply cable is disconnected from the pole interior rack power supply connector, allowing the pole interior network equipment installed by the pole interior disassembling rack to exit the pole interior space.

Preferably, the streetlight said above, wherein the pole interior cable installing area is located around the pole interior rack installing area, avoiding the pole interior rack disassembling channel, allowing the network cable and the power supply cable to extend to the pole interior rack installing area without interfering with the pole interior rack disassembling channel.

Preferably, the streetlight said above, wherein the streetlight pole has a pole body that forms the pole interior space inside, and the pole interior rack disassembling channel passes through the pole body, enabling the pole interior disassembling rack to enter the pole interior rack installing area through the pole body, and the pole interior cable installing area is located between the pole body and the pole interior rack installing area.

Preferably, the streetlight said above, wherein the streetlight pole further comprises a pole body reinforcement structure, which is positioned on the pole body near the pole interior rack disassembling channel to provide structural reinforcement and reduce the degree of deformation in the area adjacent to the pole interior rack disassembling channel.

Preferably, the streetlight said above, wherein the pole body has a pole body cable managing structure positioned within the pole interior cable installing area to organize the placement of the network cable and the power supply cable.

Preferably, the streetlight said above, wherein the pole interior disassembling rack further comprises a pole interior rack vertical extending wall, and the pole interior rack vertical extending wall can extend vertically within the pole interior space to provide a designated position for installing the pole interior network equipment within the pole interior space, wherein the pole interior cable installing area is located between the pole body and the pole interior rack vertical extending wall.

Preferably, the streetlight said above, wherein the pole interior disassembling rack further comprises a pole interior rack horizontal extending wall, and the pole interior rack horizontal extending wall can extend horizontally within the pole interior space to facilitate the installation of the pole interior network equipment at the designated position in the pole interior space.

Preferably, the streetlight said above, wherein the pole interior disassembling rack further comprises a pole interior rack cable operating channel, and the pole interior rack cable operating channel is designed for handling the connection of the network cable and the power supply cable, allowing the network cable and the power supply cable to be respectively connected to the pole interior rack network connector and the pole interior rack power supply connector, alternatively, it enables the disconnection of the network cable and the power supply cable from the pole interior rack network connector and the pole interior rack power supply connector.

Preferably, the streetlight said above, wherein the pole interior disassembling rack includes a pole interior rack horizontal extending wall, and the pole interior rack horizontal extending wall can horizontally extend within the pole interior space to provide a predetermined position for installing the pole interior network equipment in the pole interior space, wherein the pole interior rack cable operating channel is located around the pole interior rack horizontal extending wall.

Additionally, this application provides a network equipment management system designed to manage pole interior network equipment installed on streetlights as described above. The network equipment management system includes a pole interior equipment network leasing module and a pole interior equipment network adjustment module. The pole interior equipment network leasing module is used to lease the network bandwidth, the network traffic, the network communication ports, or the network providing time, wherein the network is connected to the pole interior equipment network adjustment module. Based on the leasing results of the network bandwidth, the network traffic, the network communication ports, or the network providing time, the pole interior equipment network adjustment module adjusts the network bandwidth, the network traffic, the network communication ports, or the network providing time to manage the network bandwidth, the network traffic, the network communication ports, or the network providing time, wherein the network is connected to the pole interior network equipment.

In addition, the present application further provides a network equipment management system used to manage pole interior network equipment installed on streetlights as described above. The network equipment management system comprises a pole interior equipment power supply leasing module and a pole interior equipment power supply adjustment module. The pole interior equipment power supply leasing module is used to lease the power of the power supply, the power supply ports, or the power supply providing time. Additionally, the pole interior equipment power supply leasing module is connected to the pole interior equipment power supply adjustment module. Based on the leasing results of the network bandwidth, the network traffic, the network communication ports, or the network providing time, the pole interior equipment network adjustment module adjusts the network bandwidth, the network traffic, the network communication ports, or the network providing time to manage the network bandwidth, the network traffic, the network communication ports, or the network providing time, wherein the network is connected to the pole interior network equipment.

Furthermore, the present application further provides a streetlight is capable of being equipped with a network, a power, a pole interior network equipment, and a pole exterior network equipment, comprising a network cable connected to the network; a power supply cable connected to the power; a pole interior disassembling rack including a pole interior rack network connector and a pole interior rack power supply connector, and the pole interior disassembling rack is capable of installing the pole interior network equipment, wherein the pole interior rack network connector and the pole interior rack power supply connector are respectively connected to the pole interior network equipment installed by the pole interior disassembling rack; a pole exterior disassembling rack including a pole exterior rack network connector and a pole exterior rack power supply connector, and the pole exterior disassembling rack is capable of installing the pole exterior network equipment, wherein the pole exterior rack network connector and the pole exterior rack power supply connector are respectively connected to the pole exterior disassembling rack installed by the pole exterior network equipment; a streetlight pole including a pole interior space and a pole interior rack disassembling channel, and the pole interior space can define a pole interior rack installing area and a pole interior cable installing area, wherein the pole interior rack disassembling channel is connected to the pole interior rack installing area, and the pole interior cable installing area avoids the pole interior rack disassembling channel, wherein the network cable and the power supply cable are respectively installed within the pole interior cable installing area, and the pole interior disassembling rack can be installed in the pole interior rack installing area through the pole interior rack disassembling channel or removed from the pole interior rack installing area, when the pole interior disassembling rack is installed in the pole interior rack installing area, the pole interior disassembling rack allows the pole interior network equipment to enter the pole interior space, wherein the network cable extends from the pole interior cable installing area to the pole interior rack installing area, connecting the pole interior rack network connector, allowing the pole interior network equipment to be connected to the power, when the pole interior disassembling rack is removed from the pole interior rack installing area, the network cable is disconnected from the pole interior rack network connector, and the power supply cable is disconnected from the pole interior rack power supply connector, allowing the pole interior disassembling rack to make the pole interior network equipment exit the pole interior space; the streetlight further includes a pole exterior rack installing area and a pole exterior cable installing area, and the network cable and the power supply cable are respectively installed in the pole exterior cable installing area, wherein the pole exterior disassembling rack can be installed in the pole exterior rack installing area or removed from the pole exterior rack installing area, when the pole exterior disassembling rack is installed in the pole exterior rack installing area, the network cable extends from the pole exterior cable installing area to the pole exterior rack installing area, connecting the pole exterior rack network connector, allowing the pole exterior network equipment is connected to the power, when the pole exterior disassembling rack is removed from the pole exterior rack installing area, the network cable is disconnected from the pole exterior rack network connector, and the power supply cable is disconnected from the pole exterior rack power supply connector, allowing the pole exterior disassembling rack to make the pole exterior network equipment exit the pole exterior rack installing area.

Additionally, this application provides a network equipment management system designed to manage pole exterior network equipment installed on streetlights as described above. The network equipment management system includes a pole interior equipment network leasing module and a pole interior equipment network adjustment module. The pole exterior equipment network leasing module is used to lease the network bandwidth, the network traffic, the network communication ports, or the network providing time and the pole exterior equipment network leasing module is connected to the pole exterior equipment network adjustment module. Based on the leasing results of the network bandwidth, the network traffic, the network communication ports, or the network providing time, the pole exterior equipment network adjustment module adjusts the network bandwidth, the network traffic, the network communication ports, or the network providing time to manage the network bandwidth, the network traffic, the network communication ports, or the network providing time, wherein the network is connected to the pole exterior network equipment.

Furthermore, this present application further provides a network equipment management system used to manage pole interior network equipment installed on streetlights as described above. The network equipment management system comprises a pole exterior equipment power supply leasing module and a pole exterior equipment power supply adjustment module. The pole exterior equipment power supply leasing module is used to lease the power of the power supply, the power supply ports, or the power supply providing time. Additionally, the pole exterior equipment power supply leasing module is connected to the pole exterior equipment power supply adjustment module. Based on the leasing results of power of the power supply, the power supply ports, or the power supply providing time, the pole exterior equipment power supply adjustment module adjusts the power of the power supply, the power supply ports, or the power supply providing time to manage the power of the power supply, the power supply ports, or the power supply providing time, wherein the power supply is connected to the pole exterior network equipment.

In addition, the present application further provides a streetlight is capable of being equipped with a network, a power, a pole interior network equipment, and a pole exterior network equipment, comprising a network cable connected to the network; a power supply cable connected to the power; a pole interior disassembling rack including a pole interior rack network connector and a pole interior rack power supply connector, and the pole interior disassembling rack is capable of installing the pole interior network equipment, wherein the pole interior rack network connector and the pole interior rack power supply connector are respectively connected to the pole interior network equipment installed by the pole interior disassembling rack; a pole exterior disassembling rack including a pole exterior rack network connector and a pole exterior rack power supply connector, and the pole exterior disassembling rack is capable of installing the pole exterior network equipment, wherein the pole exterior rack network connector and the pole exterior rack power supply connector are respectively connected to the pole exterior disassembling rack installed by the pole exterior network equipment; a streetlight pole including a pole interior space and a pole interior rack disassembling channel, and the pole interior space can define a pole interior rack installing area and a pole interior cable installing area, wherein the pole interior rack disassembling channel is connected to the pole interior rack installing area, and the pole interior cable installing area avoids the pole interior rack disassembling channel, wherein the network cable and the power supply cable are respectively installed within the pole interior cable installing area, and the pole interior disassembling rack can be installed in the pole interior rack installing area through the pole interior rack disassembling channel or removed from the pole interior rack installing area, when the pole interior disassembling rack is installed in the pole interior rack installing area, the pole interior disassembling rack allows the pole interior network equipment to enter the pole interior space, wherein the network cable extends from the pole interior cable installing area to the pole interior rack installing area, connecting the pole interior rack network connector, allowing the pole interior network equipment is connected to the power, when the pole interior disassembling rack is removed from the pole interior rack installing area, the network cable is disconnected from the pole interior rack network connector, and the power supply cable is disconnected from the pole interior rack power supply connector, allowing the pole interior disassembling rack to make the pole interior network equipment exit the pole interior space; the streetlight further includes a pole exterior rack installing area and a pole exterior cable installing area, and the network cable and the power supply cable are respectively installed in the pole exterior cable installing area, wherein the pole exterior disassembling rack can be installed in the pole exterior rack installing area or removed from the pole exterior rack installing area, when the pole exterior disassembling rack is installed in the pole exterior rack installing area, the network cable extends from the pole exterior cable installing area to the pole exterior rack installing area, connecting the pole exterior rack network connector, allowing the pole exterior network equipment to be connected to the power, when the pole exterior disassembling rack is removed from the pole exterior rack installing area, the network cable is disconnected from the pole exterior rack network connector, and the power supply cable is disconnected from the pole exterior rack power supply connector, allowing the pole exterior disassembling rack to make the pole exterior network equipment exit the pole exterior rack installing area.

Preferably, the streetlight said above, wherein the pole exterior rack installing area is higher than the pole interior rack installing area, allowing the pole exterior network equipment to serve as antenna equipment.

Preferably, the streetlight said above, wherein the pole exterior disassembling rack and the pole interior disassembling rack are respectively DIN rail racks, racks with locking holes, or racks with equipment fixing plates.

Preferably, the streetlight said above, wherein the streetlight pole further including an outer shell component, and the outer shell component extends to the location where the pole interior rack disassembling channel on the pole body passes through to prevent the pole interior network equipment to exist the pole interior space via the pole interior rack disassembling channel.

Preferably, the streetlight said above, wherein the pole exterior disassembling rack is installed within the outer shell component.

Preferably, the streetlight said above, wherein the outer shell component is made of metal material and is transparent or allows the passage of electromagnetic waves.

In comparison to prior art, this application provides a streetlight and its network equipment management system. The streetlight can allow for the installation of various network equipment through the design of a disassembling rack to meet the construction needs of a smart city. The network equipment management system provides the network leasing and the power supply leasing to enable the management of the network bandwidth, the network traffic, the network communication ports, or the network providing time connected to network equipment, as well as the management of the power of the power supply, the power supply ports, or the power supply providing time, wherein the power supply is connected to the network equipment. Therefore, the streetlight and its network equipment management system in this application can be utilized in the construction of a smart city.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Figure 1:
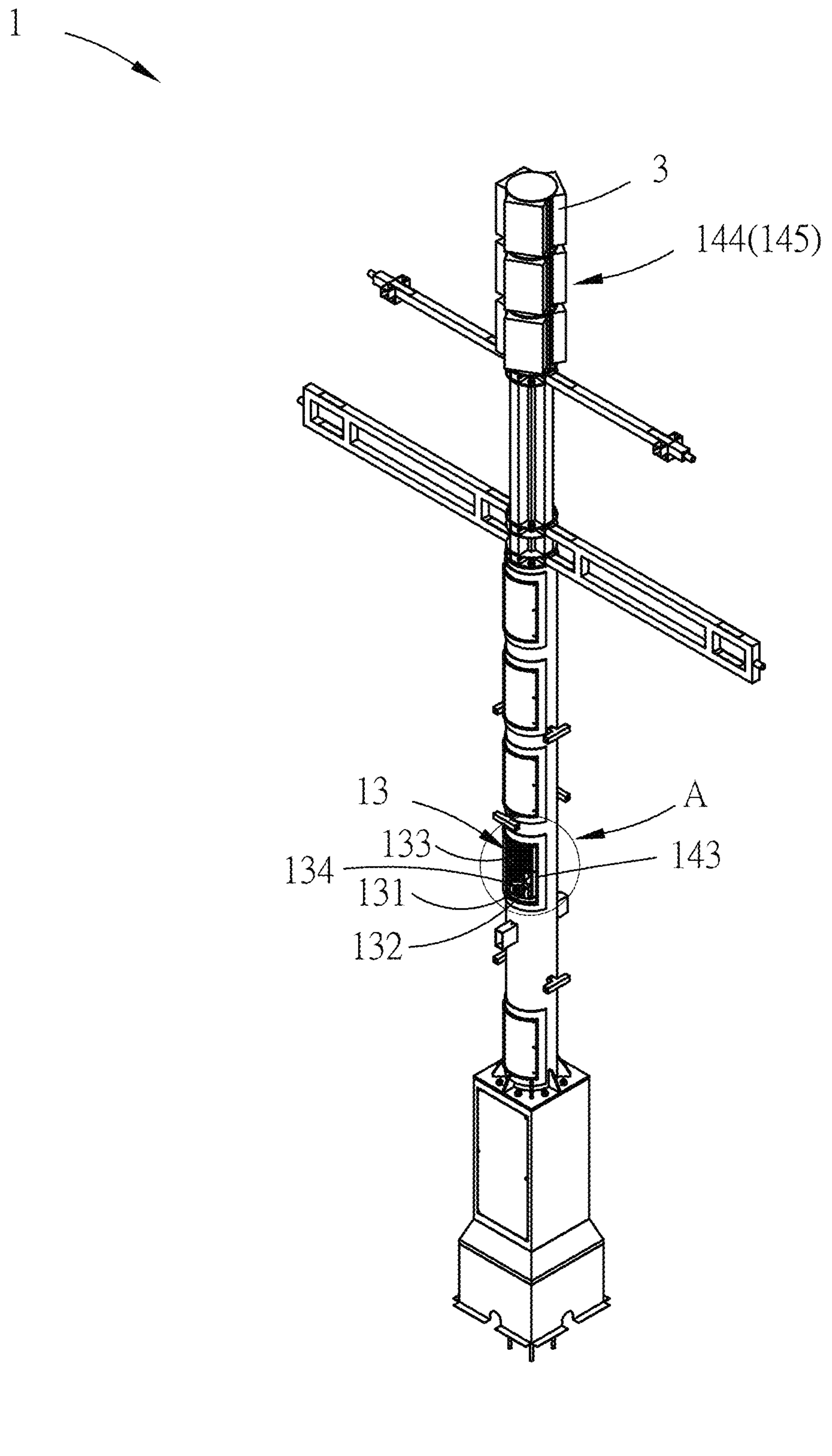
FIG. 1 is a three-dimensional schematic diagram of the embodiment of the streetlight and its network equipment management system in the present application.
Figure 2:
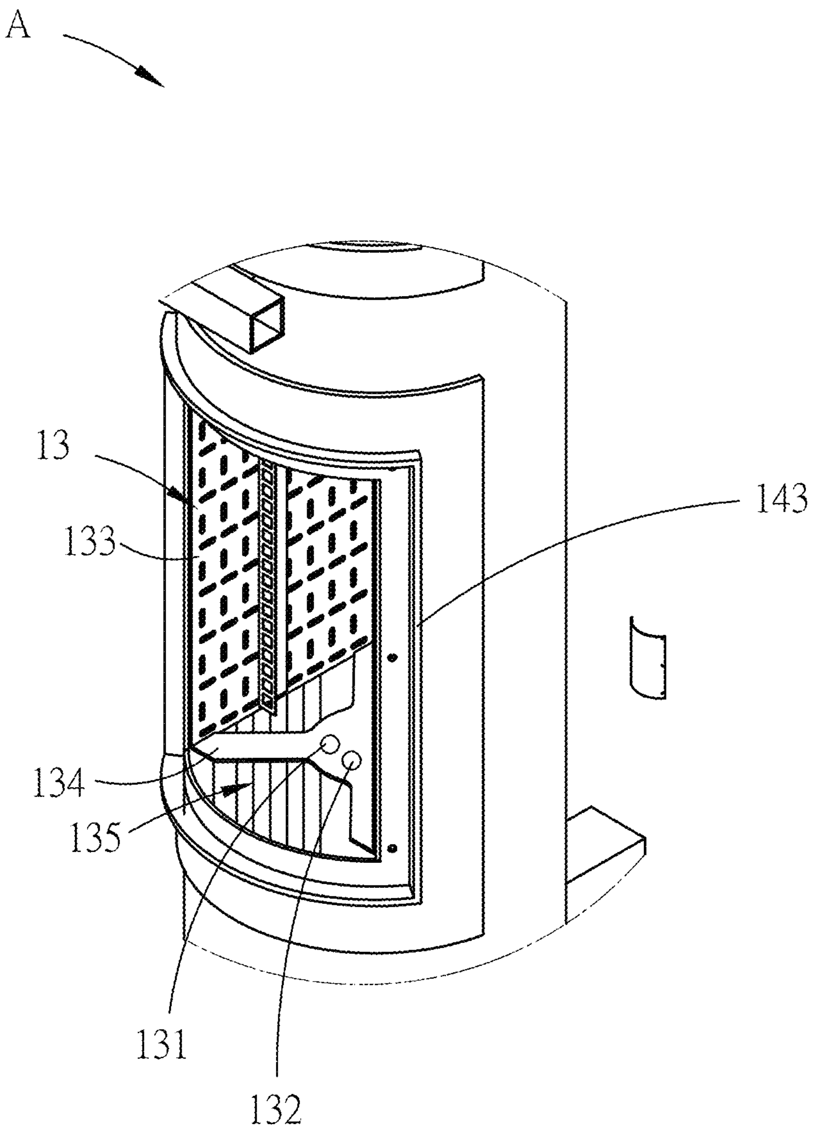
FIG. 2 is a three-dimensional schematic diagram of some components of an embodiment of the streetlight and its network equipment management system according to the present application.
Figure 3:
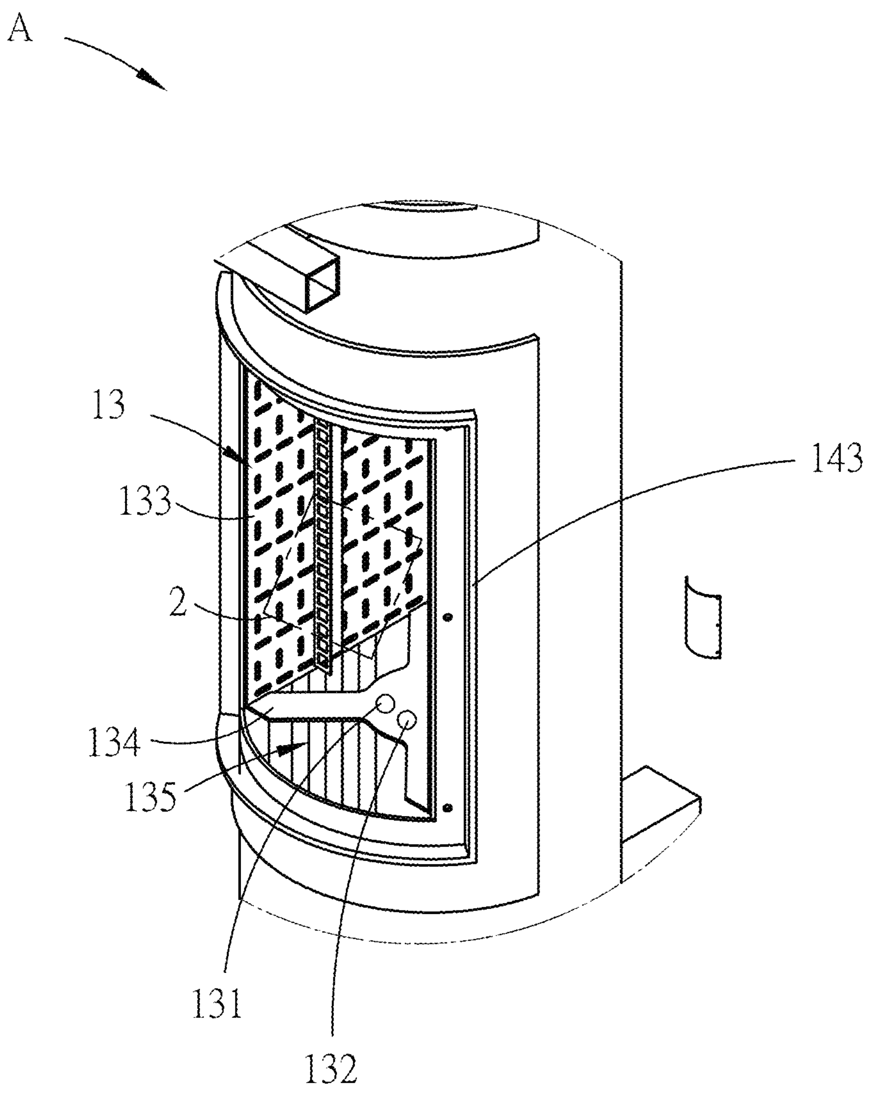
FIG. 3 is a three-dimensional schematic diagram of some components of an embodiment of the streetlight and its network equipment management system according to the present application.
Figure 4:
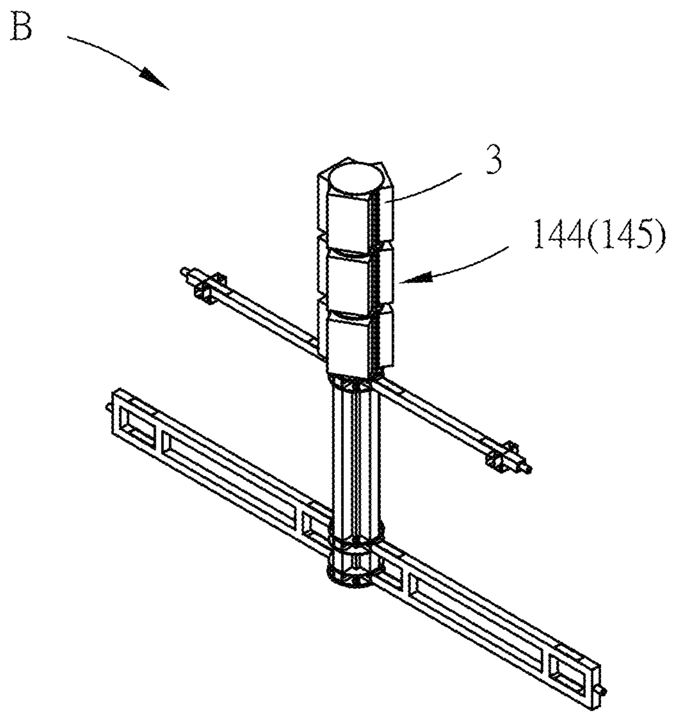
FIG. 4 is a three-dimensional schematic diagram of some components of an embodiment of the streetlight and its network equipment management system according to the present application.
Figure 5:
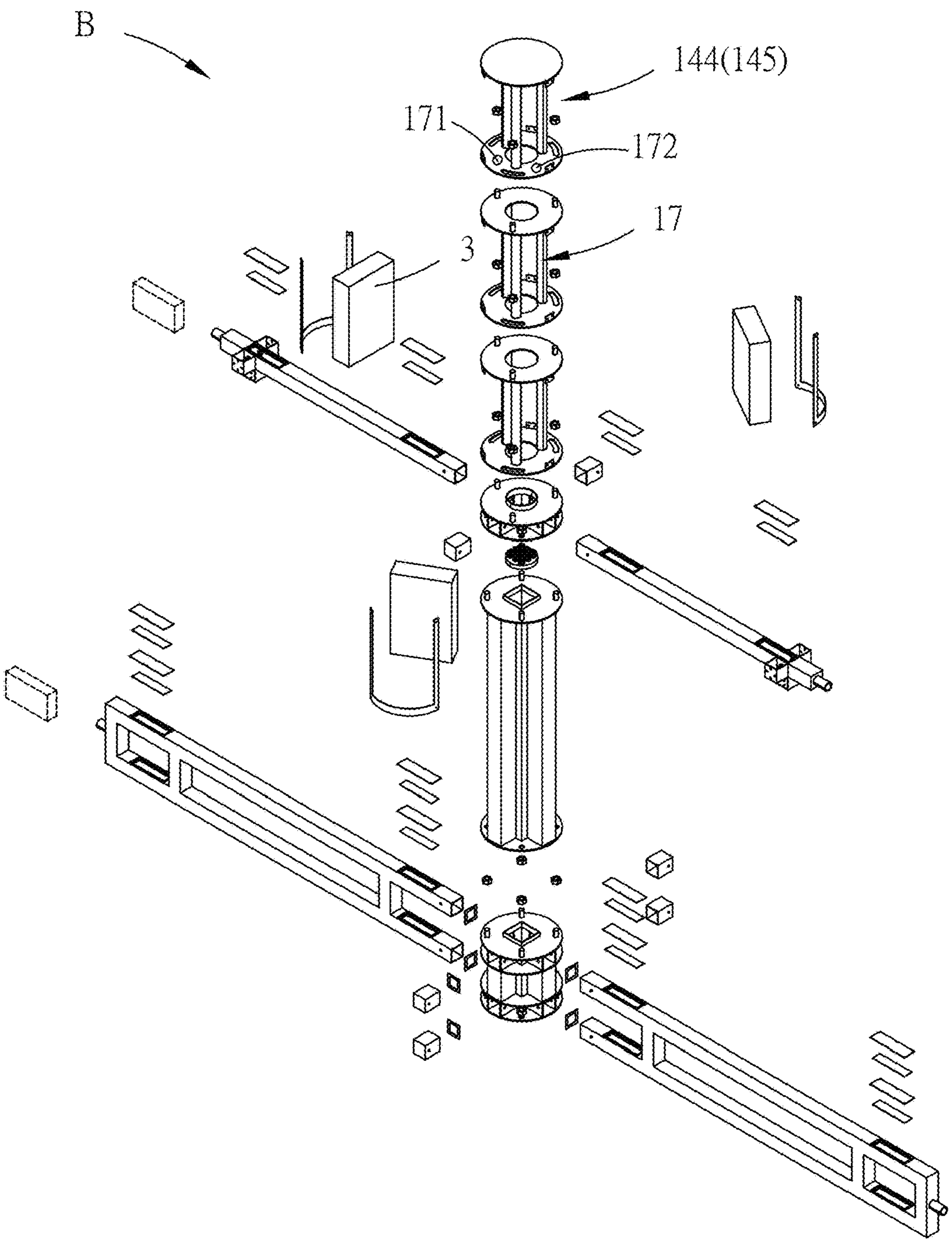
FIG. 5 is an exploded schematic diagram of some components of an embodiment of the streetlight and its network equipment management system according to the present application.
Figure 6:
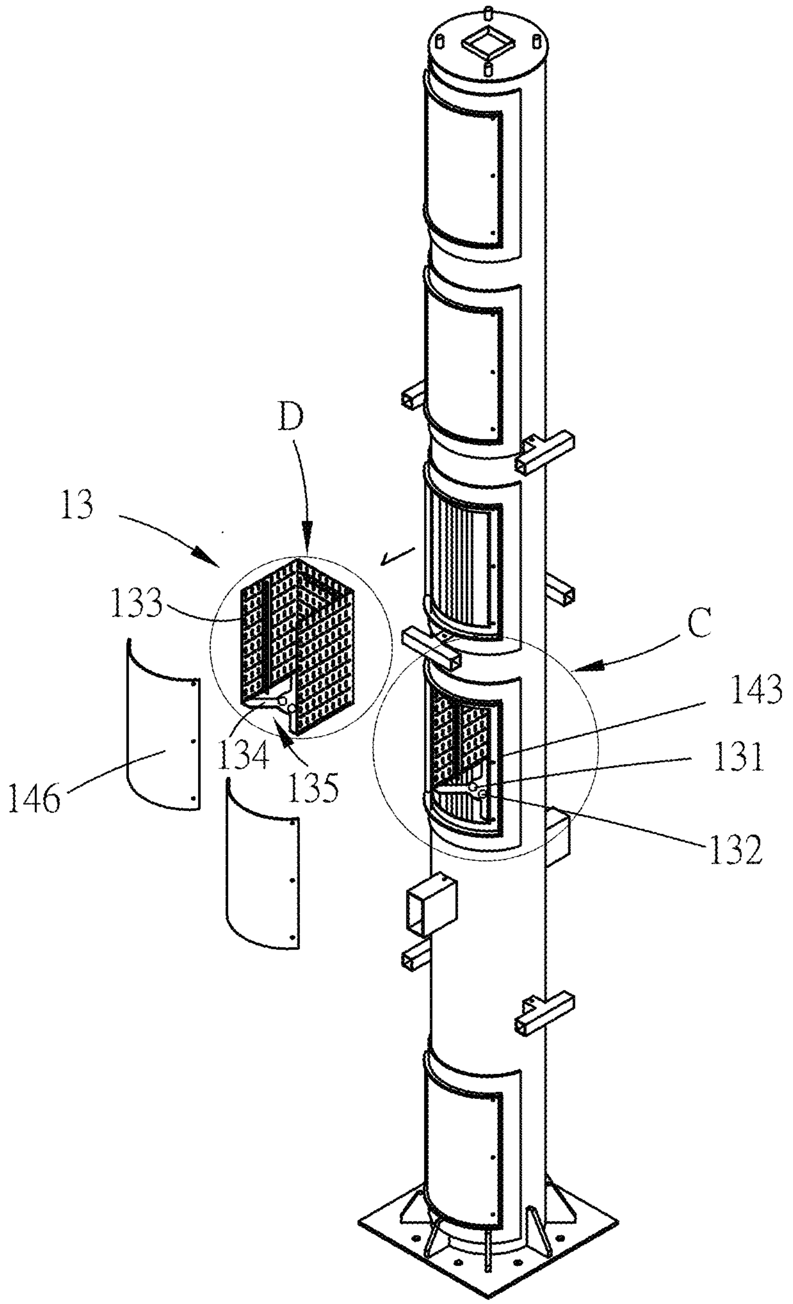
FIG. 6 is a three-dimensional schematic diagram of some components of an embodiment of the streetlight and its network equipment management system according to the present application.
Figure 7:
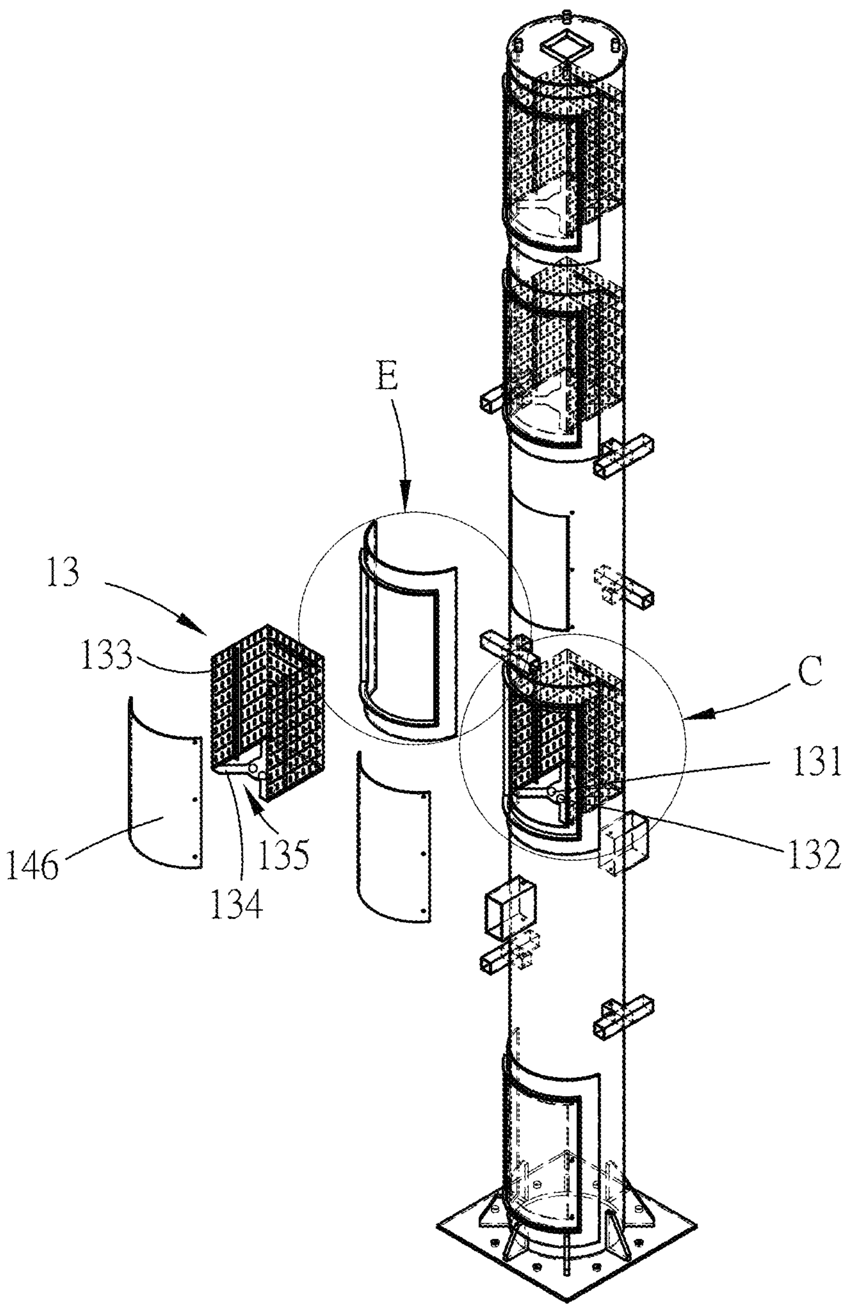
FIG. 7 is a three-dimensional schematic diagram of some components of an embodiment of the streetlight and its network equipment management system according to the present application.
Figure 8:
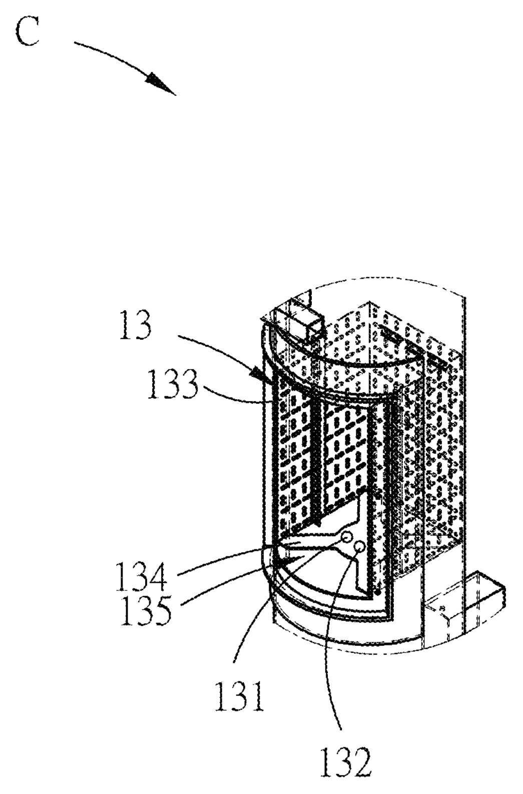
FIG. 8 is a three-dimensional schematic diagram of some components of an embodiment of the streetlight and its network equipment management system according to the present application.
Figure 9:
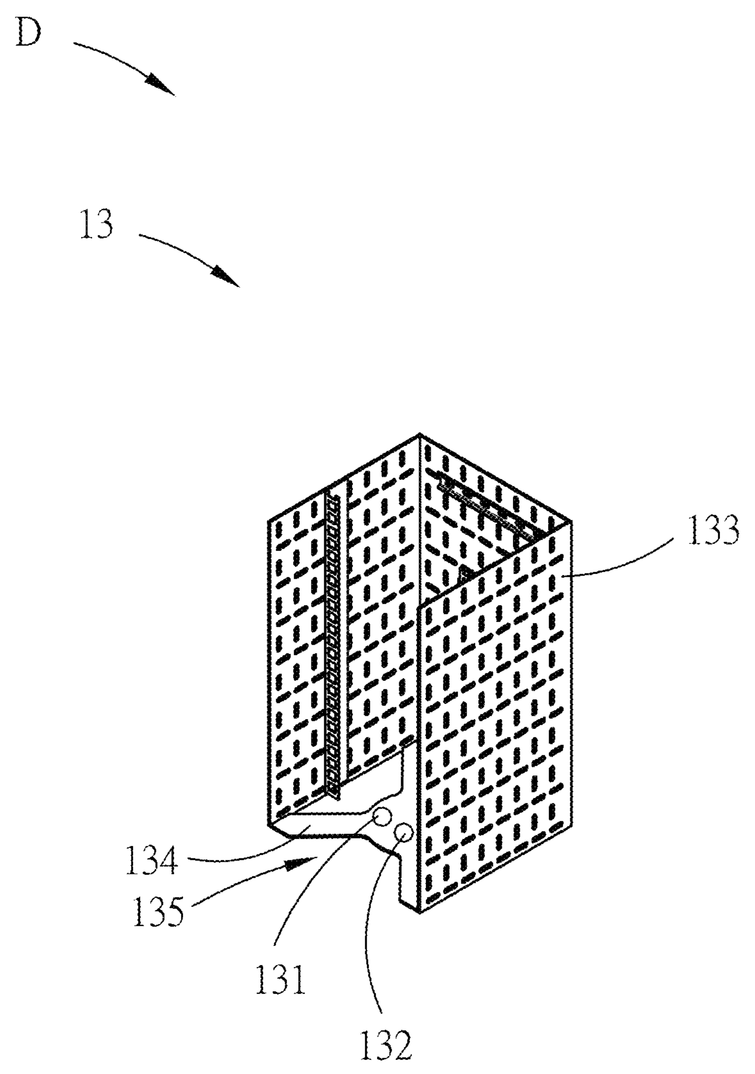
FIG. 9 is a three-dimensional schematic diagram of some components of an embodiment of the streetlight and its network equipment management system according to the present application.
Figure 10:
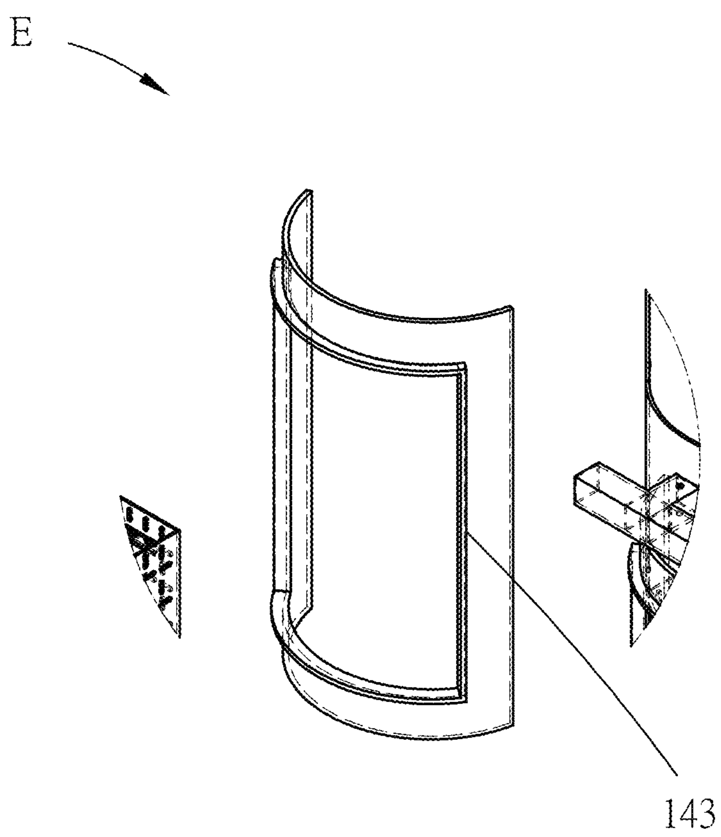
FIG. 10 is a three-dimensional schematic diagram of some components of an embodiment of the streetlight and its network equipment management system according to the present application.
Figure 11:
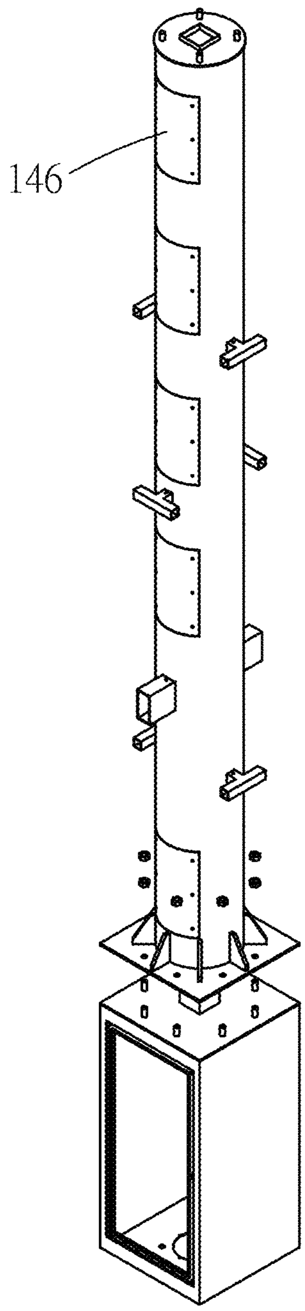
FIG. 11 is a three-dimensional schematic diagram of some components of an embodiment of the streetlight and its network equipment management system according to the present application.
Figure 12:
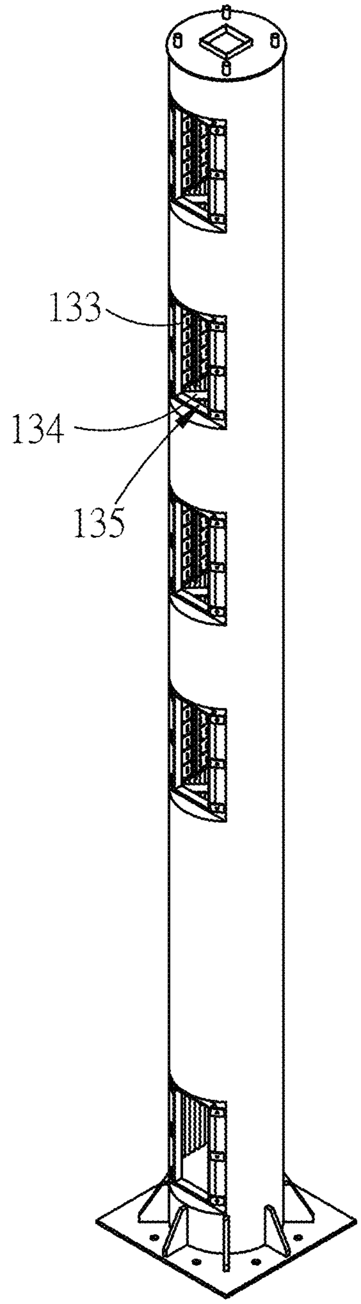
FIG. 12 is a three-dimensional schematic diagram of some components of an embodiment of the streetlight and its network equipment management system according to the present application.
Figure 13:
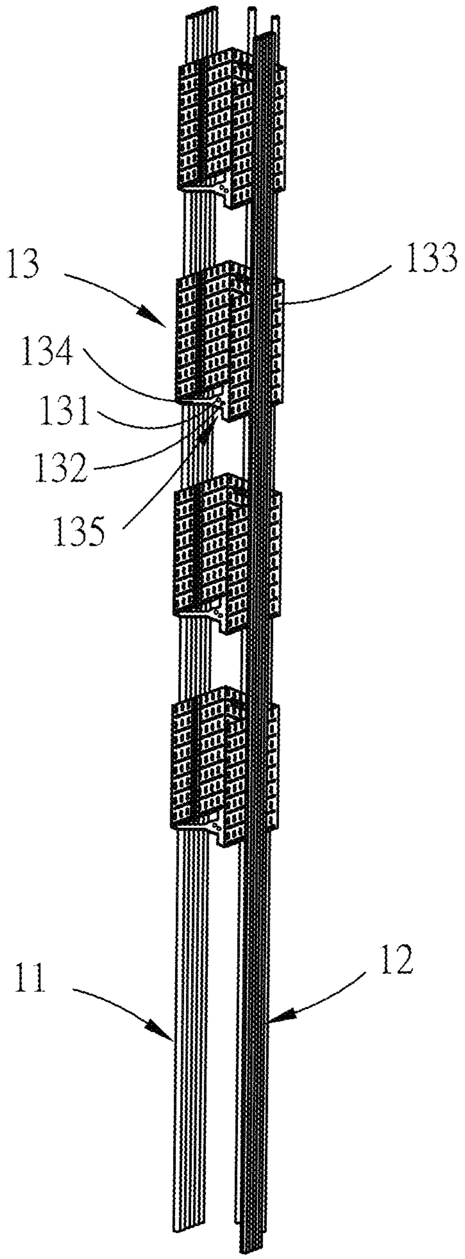
FIG. 13 is a three-dimensional schematic diagram of some components of an embodiment of the streetlight and its network equipment management system according to the present application.
Figure 14:
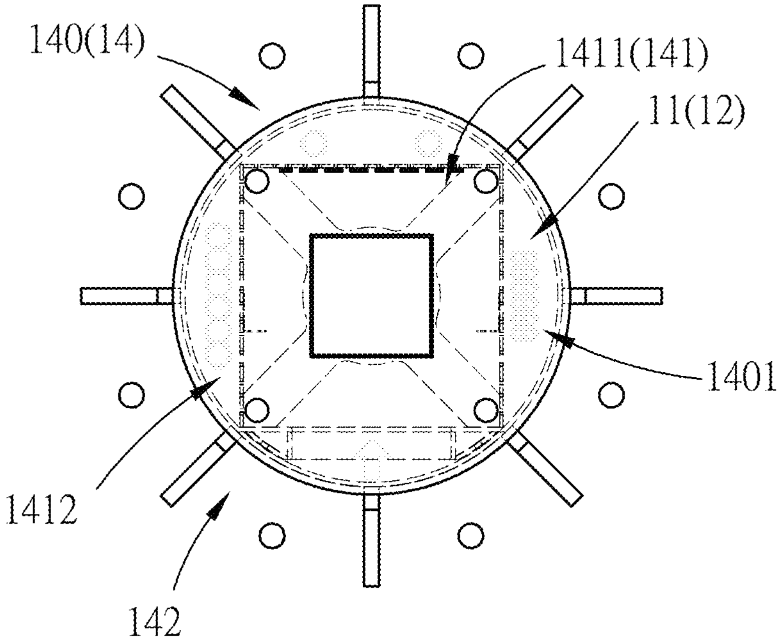
FIG. 14 is a three-dimensional schematic diagram of some components of an embodiment of the streetlight and its network equipment management system according to the present application.
Figure 15:
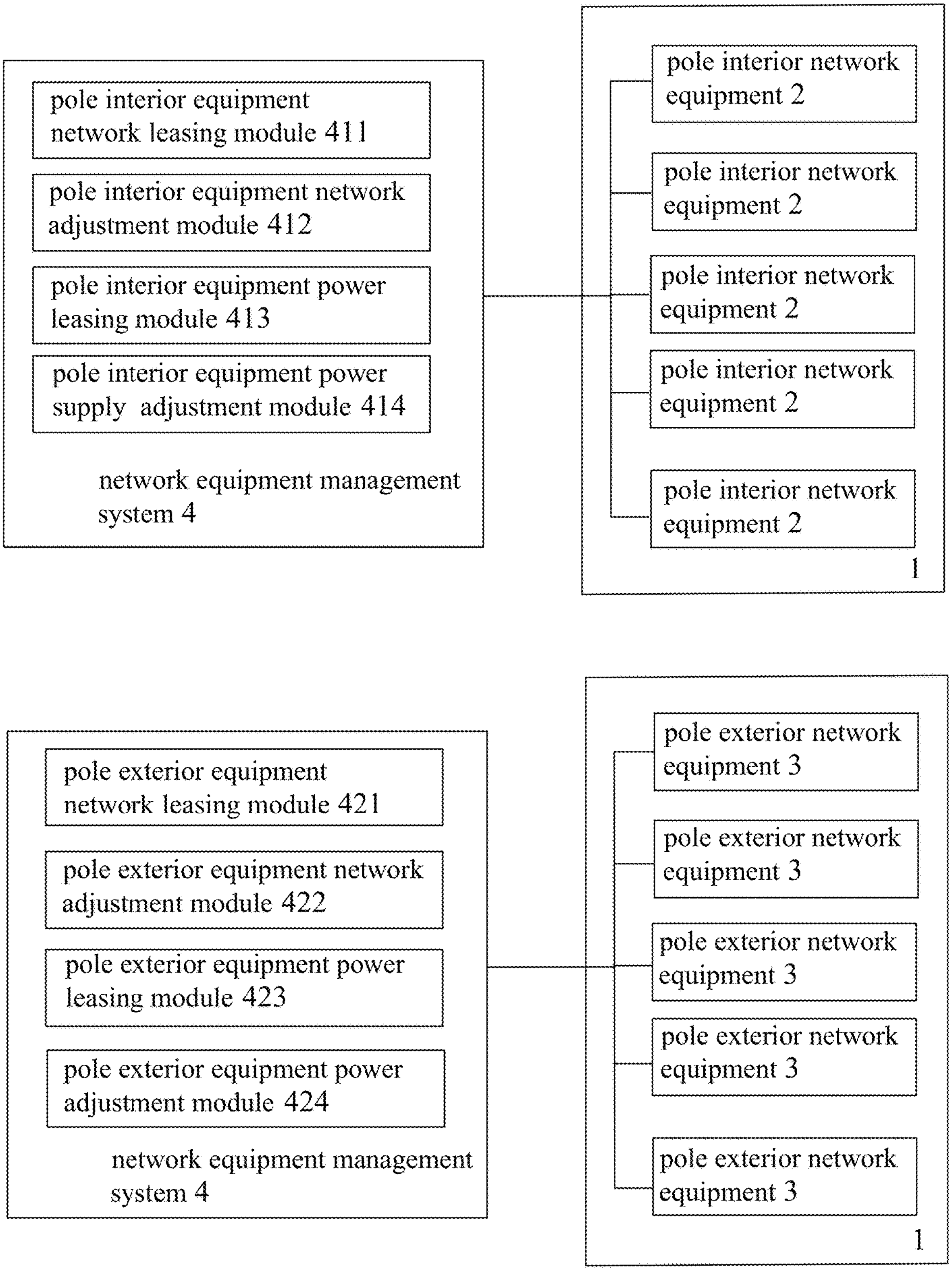
FIG. 15 is a structural schematic diagram of some components of an embodiment of the streetlight and its network equipment management system according to the present application.

For a detailed description of the embodiments disclosed in the present application, please refer to FIGS. 1 to 15.

In the embodiments shown in FIGS. 1 to 15, the streetlight 1 can be equipped a network, a power supply, a pole interior network equipment 2, and a pole exterior network equipment 3. The streetlight 1 comprises a network cable 11, a power supply cable 12, a pole interior disassembling rack 13, a pole exterior disassembling rack 17, and a streetlight pole 14. The network cable 11, for example, is a network cable or optical fiber capable of connecting to the network, while the power supply cable 12, for example, is an electric cable capable of connecting to a power supply.

The pole interior disassembling rack 13 can be installed with the pole interior network equipment 2. Accordingly, the pole interior disassembling rack 13 is equipped with a pole interior rack network connector 131 and a pole interior rack power supply connector 132. When the pole interior network equipment 2 is installed on the pole interior disassembling rack 13, the pole interior rack network connector 131 can connect to the pole interior network equipment 2 to transmit network signal, and the pole interior rack power supply connector 132 can connect to the pole interior network equipment 2 to transmit power supply signal. In other words, the pole interior rack network connector 131 and the pole interior rack power supply connector 132 can respectively connect to the pole interior network equipment 2 installed on the pole interior disassembling rack 13. The pole interior network equipment 2 may be, for example, POE switches, Internet of Things (IOT) gateway base stations (CU/DU/RU), NVR, MEC servers, or UPF servers, but not limited to these examples; any network equipment can serve as the pole interior network equipment 2.

The pole exterior disassembling rack 17 is capable of installing the pole exterior network equipment 3. Correspondingly, the pole exterior disassembling rack 17 includes a pole exterior rack network connector 171 and a pole exterior rack power supply connector 172. When the pole exterior network equipment 3 is installed on the pole exterior disassembling rack 17, the pole exterior rack network connector 171 can connect to the pole exterior network equipment 3 to transmit network signal, and the pole exterior rack power supply connector 172 can connect to the pole exterior network equipment 3 to transmit power supply signal. In other words, the pole exterior rack network connector 171 and the pole exterior rack power supply connector 172 can respectively connect to the pole exterior network equipment 3 installed on the pole exterior disassembling rack 17. The pole exterior network equipment 3 may be, for example, antenna devices, network surveillance cameras, or network environmental detectors, but not limited to these examples; any network equipment can serve as pole exterior network equipment 3.

In the embodiment said above, the streetlight pole 14 has a pole body 140, a pole interior space 141, a pole interior rack disassembling channel 142, and a pole body reinforcement structure 143. The pole body 140 forms the pole interior space 141 internally, and the pole interior space 141 at least can define the pole interior rack installing area 1411 and the pole interior cable installing area 1412. The pole interior rack disassembling channel 142 can pass through the pole body 140 to enter the pole interior rack installing area 1411, allowing the pole interior rack disassembling channel 142 to be in communication with the pole interior rack installing area 1411. As a result, the pole interior disassembling rack 13 can enter the pole interior rack installing area 1411 through the pole interior rack disassembling channel 142. The structure of the portion near the pole interior rack disassembling channel 142 on the pole body 140 is weak, so the portion near the pole interior rack disassembling channel 142 on the pole body 140 is more prone to deformation. Therefore, the pole body reinforcement structure 143 is positioned near the pole interior rack disassembling channel 142 on the pole body 140. The pole body reinforcement structure 143, for example, includes a structure with ribs and provides structural reinforcement to the pole body 140, reducing the degree of deformation of the portion near the pole interior rack disassembling channel 142 on the pole body 140 to ensure that the pole interior disassembling rack 13 can enter the pole interior rack installing area 1411 through the pole interior rack disassembling channel 142.

In the embodiment said above, the network cable 11 and the power supply cable 12 are respectively installed in the pole interior cable installing area 1412. The pole interior cable installing area 1412 is located around the pole interior rack installing area 1411 and avoids of the pole interior rack disassembling channel 142 to allow the network cable 11 and the power supply cable 12 to extend to the pole interior rack installing area 1411 without interfering with the pole interior rack disassembling channel 142. Consequently, the pole interior disassembling rack 13 can be installed in or removed from the pole interior rack installing area 1411 through the pole interior rack disassembling channel 142 without being affected by the network cable 11 and the power supply cable 12.

In the embodiment said above, the pole interior cable installing area 1412 is positioned between the pole body 140 and the pole interior rack installing area 1411. Correspondingly, the pole body 140 has a pole body cable managing structure 1401, and the pole body cable managing structure 1401 is located in the pole interior cable installing area 1412 to organize the layout of the network cable 11 and the power supply cable 12.

Additionally, the pole interior disassembling rack 13 has a pole interior rack vertical extending wall 133 and a pole interior rack horizontal extending wall 134. The pole interior rack vertical extending wall 133 can extend vertically within the pole interior space 141, while the pole interior rack horizontal extending wall 134 can extend horizontally within the pole interior space 141. In the embodiment said above, the pole interior network equipment 2 can be positioned at a predetermined location within the pole interior space 141 by being installed on at least one of the pole interior rack vertical extending wall 133 or the pole interior rack horizontal extending wall 134. In the embodiment said above, the pole interior cable installing area 1412 is positioned between the pole body 140 and the pole interior rack vertical extending wall 133, but this is not limiting, as any location within the pole interior space 141 that avoids the position of the pole interior rack disassembling channel 142 can serve as the pole interior cable installing area 1412.

It should be noted that when the pole interior disassembling rack 13 is installed in the pole interior rack installing area 1411, the pole interior disassembling rack 13 allows the pole interior network equipment 2 to enter the pole interior space 141, wherein the network cable 11 can extend from the pole interior cable installing area 1412 to the pole interior rack installing area 1411, connecting to the pole interior rack network connector 131. The power supply cable 12 can extend from the pole interior cable installing area 1412 to the pole interior rack installing area 1411, connecting to the pole interior rack power supply connector 132, allowing the pole interior network equipment 2 to be respectively connected to the network and the power supply, enabling the operation for use in smart cities.

Additionally, when the pole interior disassembling rack 13 is removed from the pole interior rack installing area 1411, the network cable 11 is disconnected from the pole interior rack network connector 131, and the power supply cable 12 is disconnected from the pole interior rack power supply connector 132 to allow the pole interior disassembling rack 13 to facilitate the pole interior network equipment 2 to exit the pole interior space 141, facilitating maintenance or replacement of the pole interior network equipment 2.

In the embodiment said above, the streetlight pole 14 further has a pole exterior rack installing area 144 and a pole exterior cable installing area 145. The network cable 11 and the power supply cable 12 are further respectively installed in the pole exterior cable installing area 145. The pole exterior disassembling rack 17 can be installed in the pole exterior rack installing area 144 or removed to exit the pole exterior rack installing area 144. It should be noted that when the pole exterior disassembling rack 17 is installed in the pole exterior rack installing area 144, the network cable 11 can extend from the pole exterior cable installing area 145 to the pole exterior rack installing area 144, connecting to the pole exterior rack network connector 171. The power supply cable 12 can extend from the pole exterior cable installing area 145 to the pole exterior rack installing area 144, connecting to the pole exterior rack power supply connector 172, allowing the pole exterior network equipment 3 to be respectively connected to the network and the power supply, enabling the operation for use in smart cities.

Additionally, when the pole exterior disassembling rack 17 is removed and exits the pole exterior rack installing area 144, the network cable 11 is disconnected from the pole exterior rack network connector 171, and the power supply cable 12 is disconnected from the pole exterior rack power supply connector 172 to allow the pole exterior disassembling rack 17 to facilitate the pole exterior network equipment 3 to exit the pole exterior rack installing area 144, facilitating maintenance or replacement of the pole exterior network equipment 3.

In the embodiment said above, the pole interior disassembling rack 13 has a pole interior rack cable operating channel 135. The pole interior rack cable operating channel 135 is perforated and provides external objects to pass through the pole interior disassembling rack 13 to manipulate the connection of the network cable 11 and the power supply cable 12. It should be noted that the external objects can respectively connect the network cable 11 and the power supply cable 12 to the pole interior rack network connector 131 and the pole interior rack power supply connector 132 via the pole interior rack cable operating channel 135, or disconnect the network cable 11 and the power supply cable 12 from the pole interior rack network connector 131 and the pole interior rack power supply connector 132. In the embodiment said above, the pole interior rack cable operating channel 135 is located on the pole interior rack horizontal extending wall 134, but this is not limiting, the pole interior rack cable operating channel 135 can optionally be located on the pole interior rack vertical extending wall 133.

In response to the development of smart cities, the pole exterior network equipment 3 can include antenna devices, network surveillance cameras, or network environmental detectors. Therefore, the pole exterior rack installing area 144 can be positioned higher than the pole interior rack installing area 1411, allowing the pole exterior network equipment 3 to transmit and receive the network signal from a high position. The pole exterior disassembling rack 17 and the pole interior disassembling rack 13 are respectively DIN rail racks, racks with lock holes, or racks with equipment fixing plates, respectively providing to install the pole interior network equipment 2 and the pole exterior network equipment 3, contributing to the development of smart cities.

The streetlight pole 14 further includes an outer shell component 146. The outer shell component 146 extends to the position on the pole body 140 where the pole interior rack disassembling channel 142 passes, preventing the pole interior network equipment 2 from exiting the pole interior space 141 through the pole interior rack disassembling channel 142. The pole exterior disassembling rack 17 is positioned on the outer shell component 146, and the outer shell component 146 can be the outer shell component which is made of metal material, is transparent, or allows the passage of electromagnetic waves.

In the embodiment said above, the network equipment management system 4 is used to manage the pole interior network equipment 2 installed on the streetlight 1. It should be noted that the network equipment management system 4 includes a pole interior equipment network leasing module 411, a pole interior equipment network adjustment module 412, a pole interior equipment power supply leasing module 413, and a pole interior equipment power supply adjustment module 414.

The pole interior equipment network leasing module 411 is used to lease the network bandwidth, the network traffic, the network communication ports, or the network providing time. In the above embodiment, the pole interior equipment network leasing module 411 is connected to the pole interior equipment network adjustment module 412. Based on the leasing results of the network bandwidth, the network traffic, the network communication ports, or the network providing time, the pole interior equipment network adjustment module 412 adjusts the network bandwidth, the network traffic, the network communication ports, or the network providing time, thereby managing the network bandwidth, the network traffic, the network communication ports, or the network providing time, wherein the network is connected to the pole interior network equipment 2.

The pole exterior equipment network leasing module 421 is used to lease the network bandwidth, the network traffic, the network communication ports, or the network providing time. In the above embodiment, the pole exterior equipment network leasing module 421 is connected to the pole exterior equipment network adjustment module 422. Based on the leasing results of the network bandwidth, the network traffic, the network communication ports, or the network providing time, the pole exterior equipment network adjustment module 422 adjusts the network bandwidth, the network traffic, the network communication ports, or the network providing time, thereby managing the network bandwidth, the network traffic, the network communication ports, or the network providing time, wherein the network is connected to the pole exterior network equipment 3.

The pole exterior equipment power supply leasing module 423 is used to lease the power of the power supply, the power supply ports, or the power supply providing time. In the above embodiment, the pole exterior equipment power supply leasing module 423 is connected to the pole exterior equipment power supply adjustment module 424. Based on the leasing results of the power of the power supply, the power supply ports, or the power supply providing time, the pole exterior equipment power supply adjustment module 424 adjusts the power of the power supply, the power supply ports, or the power supply providing time, thereby managing the power of the power supply, the power supply ports, or the power supply providing time, wherein the power supply is connected to the pole exterior network equipment 3.

It should be noted that the streetlight and its network equipment management system in this application can omit certain components, not limited to the embodiments described above. For example, the streetlight in this application includes a network cable, a power supply cable, a pole interior disassembling rack, and a streetlight pole. The network cable is connected to the network, while the power supply cable is connected to the power supply. The pole interior disassembling rack has a pole interior rack network connector and a pole interior rack power supply connector. The pole interior disassembling rack can install the pole interior network equipment, wherein the pole interior rack network connector and the pole interior rack power supply connector can respectively connect to the pole interior network equipment which the pole interior disassembling rack is installed on. The streetlight pole has a pole interior space and a pole interior rack disassembling channel. The pole interior space can define a pole interior rack installing area and a pole interior cable installing area. The pole interior rack disassembling channel is connected to the pole interior rack installing area. The pole interior cable installing area avoids the pole interior rack disassembling channel. The network cable and the power supply cable are respectively installed in the pole interior cable installing area. The pole interior disassembling rack can be installed in the pole interior rack installing area through the pole interior rack disassembling channel or disassembled to leave the pole interior rack installing area. When the pole interior disassembling rack is installed in the pole interior rack installing area, the pole interior disassembling rack allows the pole interior network equipment to enter the pole interior space, wherein the network cable can extend from the pole interior cable installing area to the pole interior rack installing area, connecting to the pole interior rack network connector, allowing the pole interior network equipment to be connected to the network. The power supply cable can extend from the pole interior cable installing area to the pole interior rack installing area, connecting to the pole interior rack power supply connector, allowing the pole interior network equipment to be connected to the power supply. When the pole interior disassembling rack is disassembled and leaves the pole interior rack installing area, the network cable is disconnected from the pole interior rack network connector, and the power supply cable are disconnected from the pole interior rack power supply connector, allowing the pole interior disassembling rack to remove the pole interior network equipment from the pole interior space.

Furthermore, the network equipment management system in this application includes the pole interior equipment network leasing module and the pole interior equipment network adjustment module. The pole interior equipment network leasing module is used to lease the network bandwidth, the network traffic, the network communication ports, or the network providing time. The pole interior equipment network leasing module is connected to the pole interior equipment network adjustment module. Based on the leasing results of the network bandwidth, the network traffic, the network communication ports, or the network providing time, the pole interior equipment network adjustment module adjusts the network bandwidth, the network traffic, the network communication ports, or the network providing time to manage the network bandwidth, the network traffic, the network communication ports, or the network providing time, wherein the network is connected to the pole interior network equipment.

Moreover, the network equipment management system in this application includes a pole interior equipment power supply leasing module and a pole interior equipment power supply adjustment module. The pole interior equipment power supply leasing module is used to lease the power of the power supply, the power supply ports, or the power supply providing time. The pole interior equipment power supply leasing module is connected to the pole interior equipment power supply adjustment module. Based on the leasing results of the power of the power supply, the power supply ports, or the power supply providing time, the pole interior equipment power supply adjustment module adjusts the power of the power supply, the power supply ports, or the power supply providing time to manage the power of the power supply, the power supply ports, or the power supply providing time, wherein the power supply is connected to the pole interior network equipment.

The streetlight in this application includes a network cable, a power supply cable, a pole exterior disassembling rack, and a streetlight pole. The network cable connects to the network. The power supply cable connects to the power supply. The pole exterior disassembling rack has a pole exterior rack network connector and a pole exterior rack power supply connector and the pole exterior disassembling rack can be installed the pole exterior network equipment wherein the pole exterior rack network connector and the pole exterior rack power supply connector can connect to the pole exterior network equipment which the pole exterior disassembling rack is installed on. The streetlight pole has a pole exterior rack installing area and a pole exterior cable installing area. The network cable and the power supply cable are respectively installed in the pole exterior cable installing area. The pole exterior disassembling rack can be installed in the pole exterior rack installing area or disassembled to leave the pole exterior rack installing area. When the pole exterior disassembling rack is installed in the pole exterior rack installing area, the network cable can extend from the pole exterior cable installing area to the pole exterior rack installing area, connecting to the pole exterior rack network connector, allowing the pole exterior network equipment to be connected to the network. The power supply cable can extend from the pole exterior cable installing area to the pole exterior rack installing area, connecting to the pole exterior rack power supply connector, allowing the pole exterior network equipment to be connected to the power supply. When the pole exterior disassembling rack is disassembled and leaves the pole exterior rack installing area, the network cable is disconnected from the pole exterior rack network connector, and the power supply cable is disconnected from the pole exterior rack power supply connector to allow the pole exterior disassembling rack to facilitate the pole exterior network equipment to leave the pole exterior rack installing area.

In addition, the network equipment management system in this application includes a pole exterior equipment network leasing module and a pole exterior equipment network adjustment module. The pole exterior equipment network leasing module is used to lease the network bandwidth, the network traffic, the network communication ports, or the network providing time. The pole exterior equipment network leasing module is connected to the pole exterior equipment network adjustment module, allowing the pole exterior equipment network adjustment module adjusts the network bandwidth, the network traffic, the network communication ports, or the network providing time based on the leasing results of the network bandwidth, the network traffic, the network communication ports, or the network providing time to manage the network bandwidth, the network traffic, the network communication ports, or the network providing time, wherein the network is connected to the pole exterior network equipment.

Moreover, the network equipment management system in this application includes a pole exterior equipment power supply leasing module and a pole exterior equipment power supply adjustment module. The pole exterior equipment power supply leasing module is used to lease the power of the power supply, the power supply ports, or the power supply providing time. The pole exterior equipment power supply leasing module is connected to the pole exterior equipment power supply adjustment module. Based on the leasing results of the power of the power supply, the power supply ports, or the power supply providing time, the pole exterior equipment power supply adjustment module adjusts the power of the power supply, the power supply ports, or the power supply providing time to manage the power of the power supply, the power supply ports, or the power supply providing time, wherein the power supply is connected to the pole exterior network equipment.

In summary, this application provides a streetlight and its network equipment management system. The streetlight can allow for the installation of various network equipment through the design of a disassembling rack to meet the construction needs of a smart city. The network equipment management system provides the network leasing and the power supply leasing to enable the management of the network bandwidth, the network traffic, the network communication ports, or the network providing time, wherein the network is connected to network equipment, as well as the management of the power of the power supply, the power supply ports, or the power supply providing time, wherein the network is connected to the network equipment. Therefore, the streetlight and its network equipment management system in this application can be utilized in the construction of a smart city.

The examples above are only illustrative to explain principles and effects of the invention, but not to limit the invention. It will be apparent to those skilled in the art that modifications and variations can be made without departing from the spirit and scope of the invention. Therefore, the protection range of the rights of the invention should be as defined by the appended claims.

What is claimed is:

1. A streetlight, which is capable of being equipped with a network system, a power supply, and a pole interior network equipment, comprising:

a network cable connected to the network system;

a power supply cable connected to the power supply;

a pole interior disassembling rack including a pole interior rack network connector and a pole interior rack power supply connector, wherein the pole interior disassembling rack is capable of installing the pole interior network equipment, wherein the pole interior rack network connector and the pole interior rack power supply connector can be respectively connected to the pole interior network equipment installed by the pole interior disassembling rack; and a streetlight pole comprising a pole interior space and a pole interior rack disassembling channel, wherein the pole interior space can define a pole interior rack installing area and a pole interior cable installing area, and the pole interior rack disassembling channel is connected to the pole interior rack installing area, and the pole interior cable installing area avoids the pole interior rack disassembling channel, wherein the network cable and the power supply cable are respectively installed in the pole interior cable installing area, and the pole interior disassembling rack can be installed in the pole interior rack installing area via the pole interior rack disassembling channel or removed from the pole interior rack installing area, when the pole interior disassembling rack is installed in the pole interior rack installing area, the pole interior disassembling rack can allow the pole interior network equipment enter the pole interior space, wherein the network cable can extend from the pole interior cable installing area to the pole interior rack installing area, thereby connecting to the pole interior rack network connector, allowing the pole interior network equipment to be connected to the network system; and the power supply cable can extend from the pole interior cable installing area to the pole interior rack installing area, thereby connecting to the pole interior rack power supply connector, allowing the pole interior network equipment to be connected to the power supply, when the pole interior disassembling rack is removed from the pole interior rack installing area, the network cable is disconnected from the pole interior rack network connector, and the power supply cable is disconnected from the pole interior rack power supply connector, allowing the pole interior network equipment installed by the pole interior disassembling rack to exit the pole interior space.

2. The streetlight of claim 1, wherein the streetlight pole has a pole body that forms the pole interior space inside, and the pole interior rack disassembling channel passes through the pole body, enabling the pole interior disassembling rack to enter the pole interior rack installing area through the pole body, and the pole interior cable installing area is located between the pole body and the pole interior rack installing area.

3. The streetlight of claim 2, wherein the streetlight pole further comprises a pole body reinforcement structure, which is positioned on the pole body near the pole interior rack disassembling channel to provide structural reinforcement and reduce the degree of deformation in the area adjacent to the pole interior rack disassembling channel.

4. The streetlight of claim 3, wherein the pole body has a pole body cable managing structure positioned within the pole interior cable installing area to organize the placement of the network cable and the power supply cable.

5. The streetlight of claim 1, wherein the pole interior disassembling rack further comprises a pole interior rack cable operating channel, and the pole interior rack cable operating channel is designed for handling the connection of the network cable and the power supply cable, allowing the network cable and the power supply cable to be respectively connected to the pole interior rack network connector and the pole interior rack power supply connector or allowing the disconnection of the network cable and the power supply cable from the pole interior rack network connector and the pole interior rack power supply connector.

6. The streetlight of claim 5, wherein the pole interior disassembling rack includes a pole interior rack horizontal extending wall, and the pole interior rack horizontal extending wall can horizontally extend within the pole interior space to provide a predetermined position for installing the pole interior network equipment in the pole interior space, wherein the pole interior rack cable operating channel is located around the pole interior rack horizontal extending wall.

7. The streetlight of claim 1, wherein the pole interior cable installing area is located around the pole interior rack installing area, avoiding the pole interior rack disassembling channel, allowing the network cable and the power supply cable to extend to the pole interior rack installing area without interfering with the pole interior rack disassembling channel.

8. The streetlight of claim 1, wherein the pole interior disassembling rack further comprises a pole interior rack vertical extending wall, and the pole interior rack vertical extending wall can extend vertically within the pole interior space to provide a designated position for installing the pole interior network equipment within the pole interior space, wherein the pole interior cable installing area is located between the pole body and the pole interior rack vertical extending wall.

9. The streetlight of claim 1, wherein the pole interior disassembling rack further comprises a pole interior rack horizontal extending wall, and the pole interior rack horizontal extending wall can extend horizontally within the pole interior space to facilitate the installation of the pole interior network equipment at the designated position in the pole interior space.

10. A network equipment management system used to manage the pole interior network equipment installed on streetlight as claimed in claim 1, wherein the network equipment management system comprises a pole interior equipment network leasing module and a pole interior equipment network adjustment module, and the pole interior equipment network leasing module is used to lease the bandwidth, traffic, communication ports, or service time of the network system and is connected to the pole interior equipment network adjustment module, based on the results of leasing the bandwidth, traffic, communication ports, or service time of the network system, allowing the pole interior equipment network adjustment module adjusts the bandwidth, traffic, communication ports, or service time of the network system, to manage the bandwidth, traffic, communication ports, or service time of the network system to which the pole interior network equipment is connected; the network equipment management system further includes a pole interior equipment power supply leasing module and a pole interior equipment power supply adjustment module, and the pole interior equipment power supply leasing module is used to lease power from the power supply, ports of the power supply, or service time of the power supply and is connected to the pole interior equipment power supply adjustment module, based on the results of leasing the power, ports of the power supply, or service time of the power supply, the pole interior equipment power supply adjustment module adjusts the power, ports of the power supply, or service time of the power supply, to manage the power, ports of the power supply, or service time of the power supply to which the pole interior network equipment is connected.

11. A streetlight is capable of being equipped with a network system, a power supply, a pole interior network equipment, and a pole exterior network equipment, comprising:

a network cable connected to the network system;

a power supply cable connected to the power supply;

a pole interior disassembling rack including a pole interior rack network connector and a pole interior rack power supply connector, and the pole interior disassembling rack is capable of installing the pole interior network equipment, wherein the pole interior rack network connector and the pole interior rack power supply connector are respectively connected to the pole interior network equipment installed by the pole interior disassembling rack;

a pole exterior disassembling rack including a pole exterior rack network connector and a pole exterior rack power supply connector, and the pole exterior disassembling rack is capable of installing the pole exterior network equipment, wherein the pole exterior rack network connector and the pole exterior rack power supply connector are respectively connected to the pole exterior disassembling rack installed by the pole exterior network equipment;

a streetlight pole including a pole interior space and a pole interior rack disassembling channel, and the pole interior space can define a pole interior rack installing area and a pole interior cable installing area, wherein the pole interior rack disassembling channel is connected to the pole interior rack installing area, and the pole interior cable installing area avoids the pole interior rack disassembling channel, wherein the network cable and the power supply cable are respectively installed within the pole interior cable installing area, and the pole interior disassembling rack can be installed in the pole interior rack installing area through the pole interior rack disassembling channel or removed from the pole interior rack installing area, when the pole interior disassembling rack is installed in the pole interior rack installing area, the pole interior disassembling rack allows the pole interior network equipment to enter the pole interior space, wherein the network cable extends from the pole interior cable installing area to the pole interior rack installing area, connecting the pole interior rack network connector, allowing the pole interior network equipment to be connected to the power supply, when the pole interior disassembling rack is removed from the pole interior rack installing area, the network cable is disconnected from the pole interior rack network connector, and the power supply cable is disconnected from the pole interior rack power supply connector, allowing the pole interior disassembling rack to make the pole interior network equipment exit the pole interior space; and the streetlight further includes a pole exterior rack installing area and a pole exterior cable installing area, and the network cable and the power supply cable are respectively installed in the pole exterior cable installing area, wherein the pole exterior disassembling rack can be installed in the pole exterior rack installing area or removed from the pole exterior rack installing area, when the pole exterior disassembling rack is installed in the pole exterior rack installing area, the network cable extends from the pole exterior cable installing area to the pole exterior rack installing area, connecting the pole exterior rack network connector, allowing the pole exterior network equipment to be connected to the power supply, when the pole exterior disassembling rack is removed from the pole exterior rack installing area, the network cable is disconnected from the pole exterior rack network connector, and the power supply cable is disconnected from the pole exterior rack power supply connector, allowing the pole exterior disassembling rack to make the pole exterior network equipment exit the pole exterior rack installing area.

12. The streetlight of claim 11, wherein the streetlight pole further including an outer shell component, and the outer shell component extends to the location where the pole interior rack disassembling channel on the pole body passes through to prevent the pole interior network equipment to exist the pole interior space via the pole interior rack disassembling channel.

13. The streetlight of claim 11, wherein the pole exterior disassembling rack is installed within the outer shell component.

14. The streetlight of claim 11, wherein the pole exterior rack installing area is higher than the pole interior rack installing area, allowing the pole exterior network equipment to serve as antenna equipment.

15. The streetlight of claim 11, wherein the pole exterior disassembling rack and the pole interior disassembling rack are respectively DIN rail racks, racks with locking holes, or racks with equipment fixing plates.

16. The streetlight of claim 12, wherein the outer shell component is made of metal material and is transparent or allows the passage of electromagnetic waves.

* * * * *